April 3, 1962      L. H. MAGOR      3,028,191

STRUCTURAL MEMBER FOR VEHICLE FRAMES

Filed April 3, 1961      2 Sheets-Sheet 1

INVENTOR.
LESLIE H. MAGOR
BY Miketta and Glenny
ATTORNEYS.

April 3, 1962 L. H. MAGOR 3,028,191
STRUCTURAL MEMBER FOR VEHICLE FRAMES
Filed April 3, 1961 2 Sheets-Sheet 2
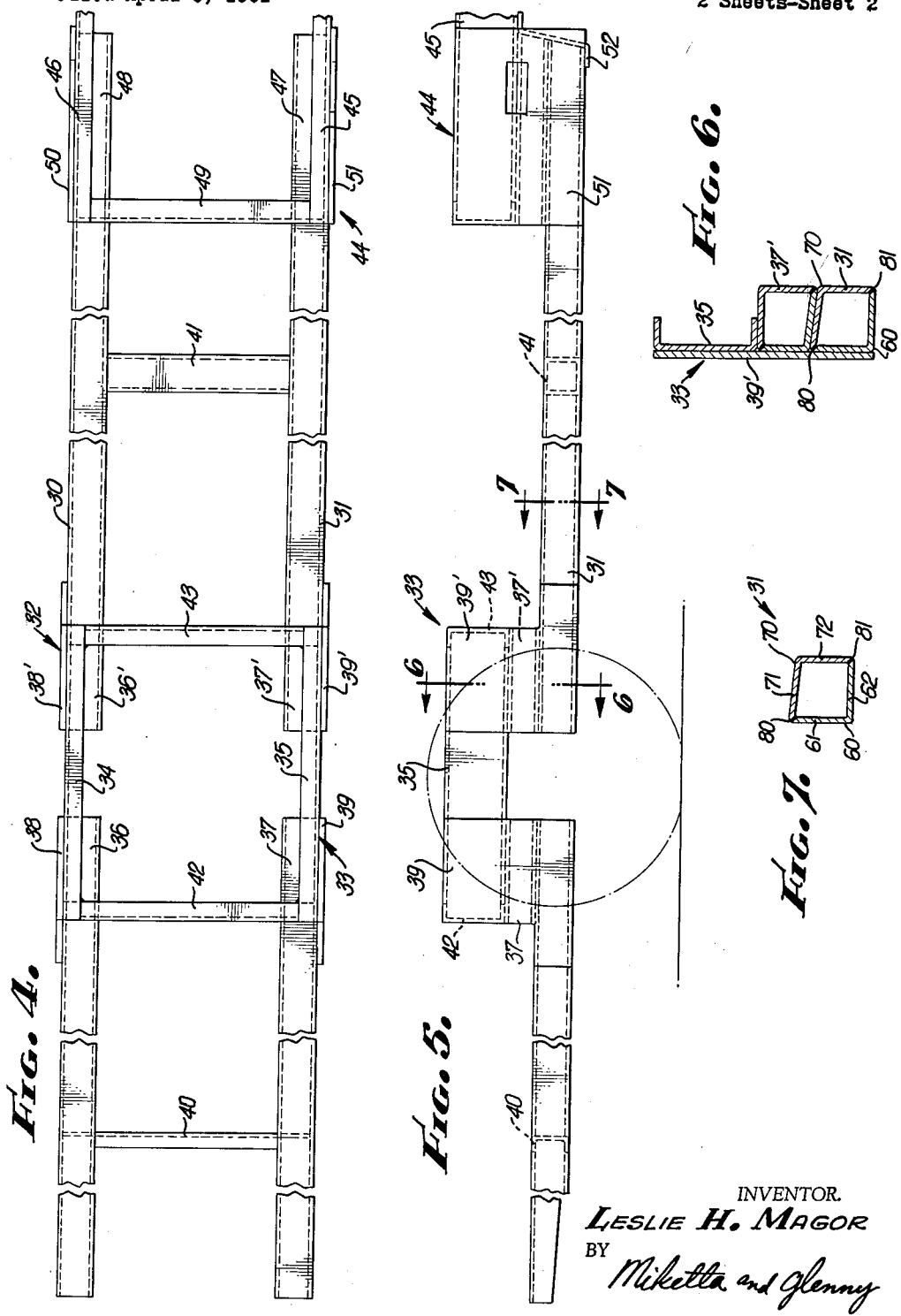
INVENTOR.
LESLIE H. MAGOR
BY Miketta and Glenny
ATTORNEYS.

United States Patent Office 3,028,191
Patented Apr. 3, 1962

3,028,191
STRUCTURAL MEMBER FOR VEHICLE FRAMES
Leslie H. Magor, San Marino, Calif., assignor to Aluminum Body Corporation, Montebello, Calif., a corporation of California
Filed Apr. 3, 1961, Ser. No. 100,122
7 Claims. (Cl. 296—28)

This invention relates generally to body and frame construction for motor vehicles and more particularly, to a construction of frame members and the method of making same for use in a vehicle or truck body frame particularly adapted to carry bottled beverages.

In transporting large bulky articles, such as water containers or crates of bottled beverages, it has been found to be advantageous to provide readily accessible compartments on the sides of a truck body. Each compartment is adapted to receive either a single large container (such as a 5 gallon bottle) or a plurality of small containers in crates or boxes. These compartments are uncovered and the crates are loaded from the sides of the vehicle. To prevent the containers from falling off of the vehicle during transit without the use of bothersome straps or chains, the truck bodies have been provided with a longitudinally extending axially positioned A frame member which provided an upwardly and inwardly inclined central wall against which the inner crates or superimposed crates could rest. This expedient was not satisfactory unless the outer, longitudinal edge areas of the floor were raised by the use of shims and the like to provide inwardly sloping floors, but the use of shims and spacers raised the floor level to an excessive height, increasing the difficulty of loading and unloading and raising the center of gravity excessively.

According to my invention, a truck chassis or frame is provided whereby the floor level is lowered, the use of shims and spacers is obviated and a stable, effective and economical truck body is attained for the handling of crates of bottled beverages.

It is an object of my invention, therefore, to disclose and provide a vehicle body and frame construction and method of making same wherein a vehicle body having floor sections convergent inwardly and downwardly from longitudinal edges may be readily received and supported by a frame without the use of shims, adaptors or the like.

It is another object of my invention to disclose and provide a construction of frame members and method of making same for a vehicle having a contoured body floor wherein said frame members are provided with a generally horizontal bottom surface and top portions thereof inclined to said bottom surfaces to readily receive and support a contoured or inclined body floor.

It is a further object of my invention to disclose and provide a method of making a hollow structural frame member having a non-rectangular cross-section for use in a vehicle frame adapted to receive a vehicle body directly thereon and where said body is provided with floor sections inwardly and downwardly convergent from its longitudinal outside edges thereof.

Generally stated, my invention contemplates the provision, with a vehicle body having a contoured floor, of a frame having a pair of generally parallel, spaced, hollow longitudinal frame members adapted to readily receive said contoured floor. The vehicle body may be provided with a contoured floor wherein sections thereof are convergent inwardly and downwardly from the longitudinal edges. A center wall may be provided having sides upwardly convergent from bottom to top, the sides and floor sections meeting at generally right angles such that the floor and sides are adapted to receive and support an article such as a water container in a position inclined inwardly from normal to the ground, toward the center of the body. According to my invention, the frame is provided with a pair of parallel, spaced, hollow, longitudinally extending frame members interconnected by cross members lying transversely to said frame members. The frame members are adapted to readily receive the inwardly and downwardly slanted floor of the vehicle body by having top surfaces similarly inclined to the horizontal plane of the frame. Such novel disposition of the top surfaces of the frame members is attained by constructing each hollow frame member of a pair of angle elements or members, to form a longitudinally extending, open ended box channel, wherein one of the angles is provided with an included angle of more than 90°. The other angle element or member is preferably provided with an included angle of substantially 90°. A top surface of each frame member is thereby provided which is inclined to the bottom surface of the frame member as desired.

In general, the frame member may be made by extruding a first angle member or element, preferably of aluminum, with an included angle of substantially 90°. The length may be readily determined by the length demanded by the size of vehicle for which the frame is constructed. A second angle element is also extruded, preferably of aluminum, of the same length as the first but with an included angle of more than 90°, preferably with an included angle of substantially 96°. The two angles are then assembled with outwardly facing flange edges in contact with each other, to form a longitudinally extending hollow box-like assembly. The so assembled angle elements are then welded along these contacting edges to provide a strong, sturdy, frame member having a top surface inclined to the bottom surface, the incline being preferably of about a 6° incline. A frame may then be assembled and then welded together employing two such longitudinal frame members in spaced, generally parallel relation with a plurality of cross-members interconnecting them. The longitudinal frame members are preferably disposed relative to each other so that their respective inclined top surfaces incline downwardly, inwardly of the assembled frame.

Further objects and advantages of my invention will become apparent from a consideration of the following detailed description of an exemplary embodiment of a vehicle body frame and structural frame members and the method of making the same according to my invention. Reference will be made to the appended sheets of drawings in which:

FIG. 4 is a plan view of the exemplary embodiment of the vehicle frame construction, according to my invention, preferably employed with the vehicle body of FIGS. 1 through 3;

FIG. 5 is a side elevation of the vehicle frame of FIG. 4;

FIG. 6 is a detail, cross-sectional view of a portion of the vehicle frame of FIG. 5 taken therein along the plane 6—6; and FIG. 7 is a detail, cross-sectional view of a portion of the vehicle frame of FIG. 5 taken therein along the plane 7—7.

Figure 1:
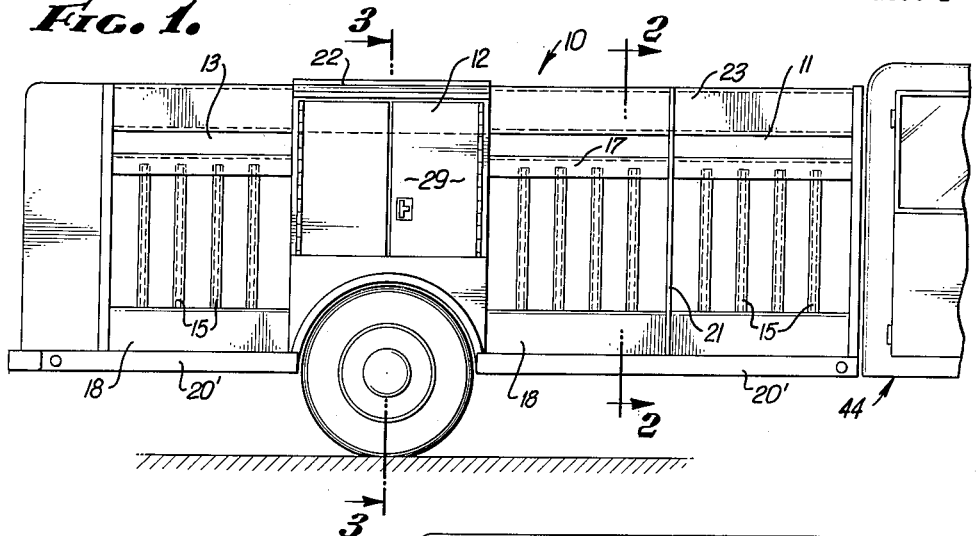
FIG. 1 is a side elevation of an exemplary motor vehicle, particularly the body portion thereof, of the type suited for use with the vehicle frame construction and method of making same according to my invention.
Figure 2:
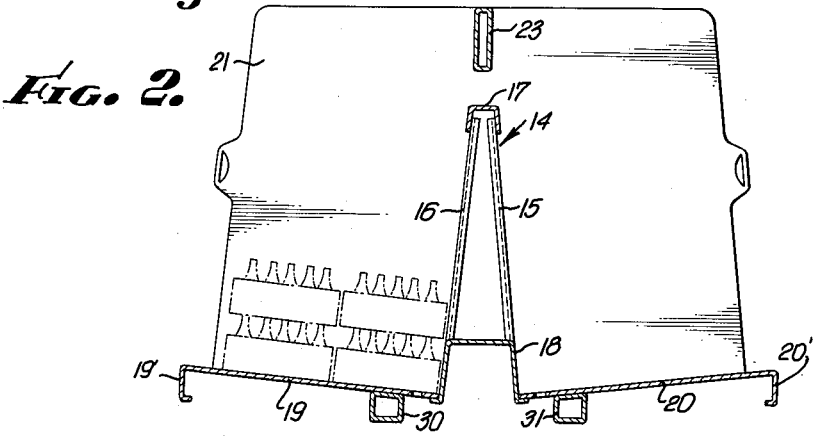
FIG. 2 is a vertical transverse view of the vehicle of FIG. 1 taken along the plane 2—2 therein and shows, in cross-section, an exemplary embodiment of a vehicle frame construction made according to my invention.
Figure 3:
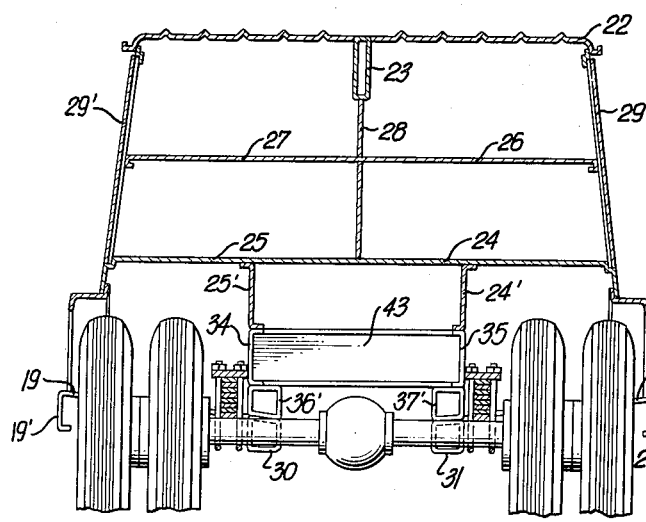
FIG. 3 is a vertical, transverse, sectional view of the vehicle of FIG. 1 taken along the plane 3—3 therein and shows, in cross-section, another portion of the exemplary embodiment of a vehicle frame construction made according to my invention.

Referring first to FIGS. 1 through 3, an exemplary embodiment of a vehicle body and frame construction is shown employing construction according to my invention. The vehicle body 10 is generally divided into a forward compartment 11, a center compartment 12 and a rear compartment 13. As shown in FIG. 2, the forward and rear compartments 11 and 13 are provided with a vertical center wall 14 having sides 15 and 16. The sides 15 and 16 are convergent upwardly from bottom to top where a cap 17 overlies and joins them. The center wall terminates at its lower side portions in a hat section 18 which is part of the floor assembly in the forward and rear compartments 11 and 13. The floor assembly, as shown in FIG. 2, includes floor plate sections 19 and 20 which are downwardly and inwardly convergent from down turned longitudinal edge portions 19' and 20', respectively. The sides 15 and 16 may be considered to extend down to the sections 19 and 20, the hat section 18 providing lower portions to walls 15 and 16, where they meet the floor sections 19 and 20 at generally right angles. The forward and rear compartments 11 and 13 are further provided with compartment dividers 21, to facilitate stacking of bottles or containers thereon, and a roof and side shell 22 of generally known nature. The sides of the vehicle body may be provided with sliding doors or be left open. A longitudinally extending top support or hanger bar or channel 23 may be provided for supporting the roof and sides.

The center compartment 12, as shown in FIGS. 1 and 3, is adapted to overlie the rear axle assembly of the vehicle, as shown in FIG. 3, and may have horizontal floor sections 24 and 25. Horizontal shelves 26 and 27, divided by a vertical center wall 28, may also be provided as well as hinged doors 29 and 29', as shown in FIG. 3.

It may be seen readily from the foregoing vehicle body description, that the vehicle frame must be adapted to receive a body wherein forward and rearward compartment floor sections are convergent inwardly and downwardly from longitudinal edges thereof and the center compartment is provided with a horizontal floor section disposed in an elevated relationship to the floors of the forward and rearward compartments. The vehicle frame construction according to my invention, and as shown by the exemplary embodiment of FIGS. 5, 6 and 7, can readily receive such a vehicle body without the use of shims or adaptors while maintaining a strong rigid construction.

As shown in FIGS. 5 and 6, the frame construction, according to my invention comprises generally a pair of hollow, spaced, substantially parallel frame members 30 and 31. Frame members 30 and 31 extend longitudinally of the frame and are each interrupted in a rearward portion thereof by a hat section 32 and 33, respectively. The hat sections 32 and 33 may be adapted to receive the vehicle rear axle assembly. Hat sections 32 and 33 each include a top traverse channel member 34 and 35, respectively, which are longitudinally aligned with and overlie portions of the interrupted frame members 30 and 31. The traverse channel members 34 and 35 are each spaced from and inter-connected to the portions of the interrupted frame members 30 and 31 which they overlie by a pair of hollow spacer members 36, 36' and 37, 37', respectively. A cross-sectional view of the hat section 33 is shown in FIG. 6, the top traverse channel member 35 being spaced above and inter-connected to the frame member 31 by the spacer 37'. Side plates 38, 38' and 39, 39' may also be provided at the hat sections 32 and 33 to provide added rigidity and strength to the section.

Longitudinally extending frame members 30 and 31 are provided with a plurality of cross-members lying transversely to and inter-connecting the frame members. As shown in FIG. 4, the rearward portions of the frame members 30 and 31 are inter-connected by the cross-member 40. Cross-member 40 may be an L-angle, as shown, where the vertically disposed leg extends into the hollow frame members 30 and 31 while the horizontal leg terminates at the side walls of the members 30 and 31 and may be welded there.

A forward cross-member 41, of generally rectangular hollow cross-section is provided in the forward portion of the frame inter-connecting the frame members 30 and 31 forwardly of the hat sections 32 and 33. Central cross-members 42 and 43 interconnect the hat sections 32 and 33.

On the forward end of the vehicle frame, a cab frame portion 44 may be provided including top traverse members 45 and 46, spacers 47 and 48, cross-members 49, and side plates 50 and 51 assembled generally as in the hat sections 32 and 33. In addition, the forward cab portion may be provided with forward Z-shaped members, such as Z-member 52 in FIG. 5, adapted to cooperate with a forward wheel and axle assembly positioned under the forward cab portion top traverse members 46 and 47.

Coming now to the particularly novel aspect of my invention, it may be noted that as shown in the FIGS. 2, 3, 6 and particularly 7, the longitudinally extending frame members 31 and 32 and the spacer members 36, 36' and 37, 37' do not have a rectangular cross section. Thus, as shown in FIG. 2, the downwardly and inwardly converging floor sections 19 and 20 are readily received by the frame members 31 and 32. The horizontal floor sections 24 and 25 are supported by the cross-members 42 and 43 and the top traverse members 34 and 35 (and Z-shaped extension plates 24' and 25') in a generally horizontal plane over the frame members 30 and 31.

The hollow, longitudinal frame members 30 and 31 are fabricated out of two angle members or elements 60 and 70, as shown in FIG. 7. Angle 60 may be provided with an included angle, between the two flange portions 61 and 62, of substantially 90°. Angle element 70 is then provided with an included angle, between the two flange portions 71 and 72, of more than 90° and preferably of substantially 96°. The elongated, non-rectangular box like frame member (as frame member 31 shown in FIG. 7) fabricated of such angle elements 60 and 70, is thereby adapted to provide a top surface which is inclined to the bottom surface of the frame member and thus suited for receiving an inclined surface thereon (such as the inclined floor sections 19 and 20 as shown in FIG. 2) while the frame member is disposed horizontally. An included angle of about 96°, between the flanges of one of the two angle elements employed, is preferred since I have found that a floor incline of about 6° is particularly well suited for use in vehicle bodies as described herein.

In fabricating the individual frame members and spacers with a non-rectangular cross-section, as hereinabove described, I have discovered that a very sturdy yet economical method of making them comprises first extruding a first angle element 60 with flange portions 61 and 62 of equal width and an included angle between the legs 61 and 62 of substantially 90°. Such extrusion may be accomplished by the use of extrusion dies of generally known nature and the metal used is preferably aluminum. The longitudinal extent of the extrusion is not a critical dimension in the method, but is merely of what ever length required for the size of the vehicle body for which the frame is being constructed.

The second step is then to extrude a second angle element 70, again preferably of aluminum and by known means having flange portions 71 and 72 of unequal length and an included angle between the flanges 71 and 72 of more than 90°, preferably of about 96°.

The two extruded angle elements are then assembled with the outwardly facing longitudinal edges of the flanges generally contacting each other to form a longitudinally extending hollow box-like frame structural member with a non-rectangular cross-section. The second angle element 70 is disposed relative to the first angle element 60 so that the shorter width flange 72, of the two unequal width flanges 71 and 72 of angle 70, is at generally right angles to the associated flange 62, of angle 60. It may be seen in FIG. 7, that accordingly, the flange 71 may then provide an inclined top surface of the frame member 31 that is inclined to the horizontal bottom surface provided by flange 62. Naturally the relative width of flanges 71 and 72 will vary according to the size of the included angle between flanges 71 and 72 for a fixed value of width for the flanges 61 and 62, the preferred included angle between flanges 71 and 72 being about 96°. It may be noted that in the structural member it is important that there be two included angles of substantially 90°, between flanges 61 and 62, and 62 and 72, respectively, so that the side flanges or walls of the frame member 31 will be substantially vertical and parallel. Such vertical disposition of the side walls or flanges provides a sturdy, rigid construction as required in vehicle frame construction where heavy vertical loading is expected.

The two angle elements 60 and 70 are then welded together in the assembled relationship described above such that welds 80 and 81 are provided longitudinally along the longitudinal edges thereof. A second member 30 is similarly constructed and the two members 30 and 31 may be positioned in spaced, generally parallel relation, to receive the cross members 40, 41, 42, 43 and 49 therebetween, with their respective top surfaces inclined downwardly, inwardly from outside edges thereof to readily receive the contoured body floor sections 19 and 20 as shown in FIG. 2. The spacer members 36, 36' and 37, 37' may be constructed by the same method, only of generally shorter longitudinal extent, and disposed as shown in FIG. 3.

As evident in FIG. 5, the rearward portions of the frame members 30 and 31 may be tapered downwardly to reduce weight where lesser loads are expected on the frame. When the frame members are so tapered, it becomes obvious that while the members 31 may be made as described for a right hand frame member, the position of the angle elements 60 and 70 in FIG. 7 must be revolved 180° about a central, vertical axis therein to provide a left hand frame member, the method of construction remaining otherwise the same.

It should be remembered, that while I have described herein only one exemplary embodiment of a vehicle frame construction and the method of making it, other embodiments, modifications, and refinements thereof may become within the scope of my invention which is defined by the following claims. Having thus described my invention, what I claim as new and desire to secure by Letters Patent is:

1. A base frame construction for uncovered, sideloading truck bodies adapted to carry superimposed crates of bottled beverages in a readily accessible and stable form, comprising: a pair of elongated, longitudinally extending box-type structural members in parallel, spaced relation, each of said members comprising an angle element having longitudinal flange portions of substantially equal width with an included angle therebetween of substantially 90° and a second angle element having flange portions of unequal width with an included angle therebetween of more than 90°, the longitudinal margins of said flanges of said two angle elements being welded together to form a box-type member having a horizontal bottom face, vertical side walls and an inclined upper face, said two box members being arranged with their top faces inclined downwardly toward a zone between said members; a planar floor plate attached to and supported by each of said top faces and extending laterally therefrom, the inner edge portions of said floor plates being spaced from each other, and an A frame having lower portions of its legs attached to said inner edge portions of the floor plates and forming an axial rib with the legs of said A frames in planes virtually at right angles to the floor plates attached thereto.

2. In a vehicle frame construction having a pair of substantially parallel, spaced, longitudinally extending frame members and a plurality of cross-members lying transverse to and interconnecting said frame members, the provision of a structural member comprising: a first angle element including a pair of outwardly directed flange portions of substantially equal width having an included angle therebetween of substantially ninety degrees; a second angle element including a pair of outwardly directed flange portions of unequal width having an included angle therebetween of more than ninety degrees; said second angle element being disposed relative to said first angle element with a flange of shorter width, of said unequal width flanges, at right angles to one of said flange portions of said first angle element, the angle elements forming a longitudinally extending, box-like structural member having a top surface inclined to a bottom surface and substantially vertical, parallel side walls.

3. The provision of a structural member as in claim 2, wherein said second angle element is provided with an included angle, between said flange portions of unequal length, of about ninety-six degrees.

4. A vehicle frame adapted to receive and support a vehicle body having floor sections convergent inwardly and downwardly from longitudinal edges, comprising: a pair of substantially parallel, spaced, hollow, longitudinally extending frame members, each of said hollow frame members being formed of two angle elements welded together, one of said angle elements having flange portions of unequal length and an included angle of more than 90°, said angle elements being disposed to each other to provide substantially parallel side walls and a top surface on said frame member inclined to a bottom surface on said frame member; and a plurality of cross-members lying transverse to and interconnecting said frame members to form a vehicle frame, each of said longitudinally extending frame members being disposed with its top surface inclined from its outside edge downwardly, inwardly toward its inside edge.

5. A frame as in claim 4 wherein said one angle element having an included angle greater than 90° is provided with an included angle of between about 95° and about 97°.

6. A frame as in claim 4 wherein each of said longitudinal extending frame members is interrupted by a hat section adapted to receive means for mounting wheels to said frame, said hat sections comprising: a top traverse member longitudinally aligned with and overlying portions of the associated interrupted frame member, and a pair of hollow spacer members interposed between said top traverse member and said portions of said frame member overlain by said traverse member, each of said hollow spacer members being composed of two spacer angle elements welded together, one of said spacer angle elements having flange portions of unequal width and an included angle greater than 90°, said spacer angle elements providing a bottom surface on said spacer member inclined to the top surface on said spacer members to lie on said inclined top surface of said frame member, the top surface of said spacer member being thereby substantially parallel to the bottom surface of said frame member.

7. A vehicle body and frame construction adapted to provide a load carrying body floor having sections convergent inwardly and downwardly from longitudinal edges thereof, comprising: a vehicle body including a vertical center wall having sides upwardly convergent from bottom to top and a floor having sections convergent inwardly and downwardly from longitudinal edges meeting said upwardly convergent center wall sides at generally right angles, and a frame supporting said body, said frame including a pair of substantially parallel spaced hollow longitudinal frame members and a plurality of cross members lying transverse to and interconnecting said longitudinal frame members, each of said hollow frame members being composed of two angle elements welded together to form an open ended box channel, one of said angle elements having flange portions of unequal width and an included angle therebetween greater than 90°, to provide a top surface on each of said frame members tapered downwardly toward the center of said frame whereby said contoured body floor may be readily received by said frame.

References Cited in the file of this patent

UNITED STATES PATENTS

| | | |
|---|---|---|
| 2,027,898 | Broulhiet | Jan. 14, 1936 |
| 2,596,478 | Gerhardt | May 13, 1952 |
| 2,792,231 | Compton | May 14, 1957 |
| 2,839,328 | Prickett et al. | June 17, 1958 |